(12) United States Patent
Gyllerstrom

(10) Patent No.: US 6,880,253 B1
(45) Date of Patent: Apr. 19, 2005

(54) RAZOR WITH A MOVABLE SHAVING HEAD

(75) Inventor: Kenneth Vincent Gyllerstrom, Athens (GR)

(73) Assignee: Bic Violex S.A., (GR)

( * ) Notice: Subject to any disclaimer, the term of this patent is extended or adjusted under 35 U.S.C. 154(b) by 0 days.

(21) Appl. No.: 09/599,743

(22) Filed: Jun. 23, 2000

(51) Int. Cl.⁷ ............................................. B26B 21/52
(52) U.S. Cl. ................................. 30/527; 30/50; 30/57
(58) Field of Search ......................... 30/527, 531, 532, 30/528, 529, 530, 533, 534, 50, 57

(56) References Cited

U.S. PATENT DOCUMENTS

| | | | |
|---|---|---|---|
| 1,455,751 A | 5/1923 | Hartman | |
| 1,639,441 A | 8/1927 | Spahr | |
| 1,693,532 A | 11/1928 | Stewart | |
| 3,868,772 A | 3/1975 | Gray | |
| 4,083,103 A | 4/1978 | Estandian | |
| 4,094,063 A | 6/1978 | Trotta | |
| 4,146,958 A | 4/1979 | Chen et al. | |
| 4,152,828 A | 5/1979 | Lund | |
| 4,198,746 A * | 4/1980 | Trotta | |
| 4,308,663 A * | 1/1982 | Ciaffone | |
| 4,347,663 A | 9/1982 | Ullmo | |
| 4,428,116 A * | 1/1984 | Chen et al. | |
| 4,475,286 A | 10/1984 | Saito | ............................ 30/87 |
| 4,481,689 A | 11/1984 | Westmoreland | |
| 4,498,235 A | 2/1985 | Jacobson | |
| 4,573,266 A * | 3/1986 | Jacobson | |
| 4,621,424 A | 11/1986 | Jacobson | |
| 4,922,609 A * | 5/1990 | Grange | |
| 4,970,784 A * | 11/1990 | Althaus et al. | |
| 5,029,391 A | 7/1991 | Althaus et al. | |
| 5,050,301 A | 9/1991 | Apprille, Jr. | |
| 5,084,969 A | 2/1992 | Althaus | |
| 5,157,834 A | 10/1992 | Chen et al. | |
| 5,206,995 A | 5/1993 | Min | |
| 5,222,300 A | 6/1993 | Althaus et al. | |
| 5,253,420 A | 10/1993 | Althaus et al. | |
| 5,333,383 A * | 8/1994 | Ferraro | |
| 5,426,853 A | 6/1995 | McNinch | |
| 5,535,518 A | 7/1996 | Althaus | |
| 5,560,106 A * | 10/1996 | Armbruster et al. | .......... 30/527 |
| 5,669,139 A | 9/1997 | Oldroyd et al. | |
| 5,761,812 A | 6/1998 | Feldman | |
| 5,787,593 A | 8/1998 | Althaus | |

(Continued)

FOREIGN PATENT DOCUMENTS

DE   29706022   *  7/1997

(Continued)

*Primary Examiner*—Stephen Choi
(74) *Attorney, Agent, or Firm*—Jones Day

(57) ABSTRACT

A shaving razor having a handle that defines a longitudinal axis, a shaving head that defines a transverse axis, a connector assembly, and a biasing element. The connector assembly couples the handle and the head so that the head can pivot upward and downward about its transverse axis and can also move toward and away from the handle with the transverse axis perpendicular to the longitudinal axis or oblique thereto. Preferably, the biasing element is separate and spaced apart from the connector assembly and biases the head into a rest position.

37 Claims, 12 Drawing Sheets

U.S. PATENT DOCUMENTS

| | | | |
|---|---|---|---|
| 5,794,354 A * | 8/1998 | Gilder | 30/50 |
| 5,953,824 A * | 9/1999 | Ferraro et al. | |
| 6,115,924 A * | 9/2000 | Oldroyd | |
| 6,122,826 A * | 9/2000 | Coffin et al. | |
| 6,301,786 B1 * | 10/2001 | Oswald et al. | 30/43.92 |
| 6,311,400 B1 * | 11/2001 | Hawes et al. | |
| 2002/0104223 A1 | 8/2002 | Oldroyd | 30/532 |

FOREIGN PATENT DOCUMENTS

| | | | |
|---|---|---|---|
| FR | 2619045 | * | 8/1987 |
| GB | 2116 470 A | | 9/1983 |
| GB | 2116470 A | | 9/1983 |
| WO | WO/89/01394 | | 2/1989 |
| WO | WO 93/20983 | * | 10/1993 |

* cited by examiner

RAZOR WITH A MOVABLE SHAVING HEAD

TECHNICAL FIELD OF THE INVENTION

This invention relates to shaving razors and, more particularly, to razors with movable shaving heads that move about or on multiple axes with respect to a handle.

BACKGROUND OF THE INVENTION

Because a shaving surface, for example, the face or the legs, is usually not a planar surface, it is common for a shaving razor to have a shaving head that is pivotable with respect to a razor handle to allow a user to be able to follow the contours of the shaving surface. Typically, however, a shaving razor has a razor blade carrier that is pivotable only about a single axis, which is parallel to the cutting edge of the razor blade. With such a shaving razor, the entire cutting edge of the shaving razor may not be utilized during shaving, which leads to uneven wear of the cutting edge and increases the time it takes to shave.

Accordingly, a desirable feature of a shaving razor is to have a shaving head that is pivotable about multiple axes. Another desirable feature of a shaving razor is to have a shaving head that provides a cushioning action when pressed against the razor handle. One example of a shaving razor having such features is disclosed in U.S. Pat. No. 4,347,663 to Ullmo. Ullmo discloses a razor handle having a pair of tabs projecting outwardly from one end of the razor handle. Each tab has an elongated slot therethrough. A blade assembly carrier is pivotably mounted to the handle by engagement of two pairs of ears on the carrier with the tabs on the handle. Specifically, the spacing between each pair of ears is slightly greater than the width of each tab so that a tab may be received between a pair of ears. The ears have openings therethrough sized to receive a rivet. Alignment of the openings in the ears with the slots in the tabs allows the ears and the tabs to be coupled together by the rivets. The blade assembly carrier is pivotable about the rivets. A pair of helical springs are provided in openings in the tabs for biasing the blade assembly carrier into a rest position. This arrangement purportedly creates a "lost motion connection," which allows pivotable motion of the carrier about the rivets, translational motion of the carrier toward and away from the handle, and "yawing" motion of the carrier about the longitudinal axis of the razor handle.

A disadvantage to the shaving razor disclosed in Ullmo is that it requires the manufacture and assembly of a number of discrete components. This is undesirable because it increases the manufacturing and assembly time. Moreover, once the tabs and ears are riveted together, the blade assembly carrier and razor handle cannot readily be detached.

Accordingly, it would be desirable to have a shaving razor with a movable shaving head that is simple and inexpensive to manufacture and assemble. Moreover, it would be desirable to have a shaving razor with a shaving head that may be easily detachable, if desired, from the razor handle.

SUMMARY OF THE INVENTION

The present invention is directed to a razor that includes a handle that defines a longitudinal axis, a head that carries at least one blade and defines a transverse axis parallel to the blade(s), a connector assembly, and a biasing element. The connector assembly moveably couples the handle to the head and allows the head to pivot forward and backward about an axis parallel to the transverse axis (a "pitching" movement), and also allows the head to move toward and away from the handle. The biasing element biases the head into a rest position against the forward and backward pivoting movement and against the movement toward and away from the handle. In this arrangement, when the head is out of the rest position, the transverse axis can be oblique or perpendicular with respect to the longitudinal axis depending on at least the force applied to the head. When the ends of the head are alternately moving toward and away from the handle or the transverse axis is oblique with respect to the longitudinal axis during the movement toward and away from the handle, the movement is called a rolling movement. When the transverse axis is perpendicular to the longitudinal axis during movement toward and away from the handle, the movement is called a cushioning movement.

In one embodiment, the connector assembly includes pins and the razor head includes cutouts for receiving the pins, wherein the cutouts have dimensions greater than the dimensions of the pins to allow the pivoting movement and the rolling and cushioning movements. More generally, a razor having a shaver head and handle which are movably coupled together may be modified in accordance with the present invention to increase the degrees of freedom of movement between the head and the handle. For instance, if the head and handle are coupled by insertion of an insertion element on one into an opening in another, the size of the opening may be increased to permit greater range of motion therein, resulting in a greater range of motion between the head and handle.

According to one aspect of the invention, the biasing element may be spaced apart from the connector assembly to permit independent action of the connector assembly and the biasing element. In one embodiment, the biasing element is at least one leaf spring disposed between the handle and the head with movable free ends biasing the head into a rest position. In this arrangement, the free ends can include cam surfaces operatively associated with a cam surface on the razor head so that the cam surfaces contact one another to bias the head into the rest position against the pivoting movement. Alternatively, the biasing element can be a spring-loaded tongue which moves along a longitudinal biasing axis.

The shaving head may be a razor blade cartridge formed for ready detachment from the handle and replacement with a new cartridge. Alternatively, the razor may be a disposable razor in which the head and handle are disposed of, together, once the blades become dull.

BRIEF DESCRIPTION OF THE DRAWINGS

To facilitate the understanding of the characteristics of the invention, the following drawings have been provided wherein.

DETAILED DESCRIPTION OF THE PREFERRED EMBODIMENTS

The present invention is directed to a razor that generally comprises a handle, a shaving head carrying blades, a connector assembly for joining the head to the handle and a biasing element. The connector assembly is configured and dimensioned to allow the head to move with respect to the handle. Preferably, the connector assembly includes a head-engaging element on the handle and a handle-engaging element on the shaving head, the head-engaging element and the handle-engaging element cooperating to couple the head and handle together while permitting relative movement therebetween. The biasing element is preferably spaced apart from the connection assembly to permit a full range of motion between the handle and the shaving head. The razor and components thereof shown in the following drawings are exemplary of razors and components in accordance with the principles of the present invention. The present invention can be utilized with various configurations of handles, heads, connection assemblies, and biasing elements, and thus the present invention is not limited to any particular types of razor configurations shown and discussed below.

Figure 1:
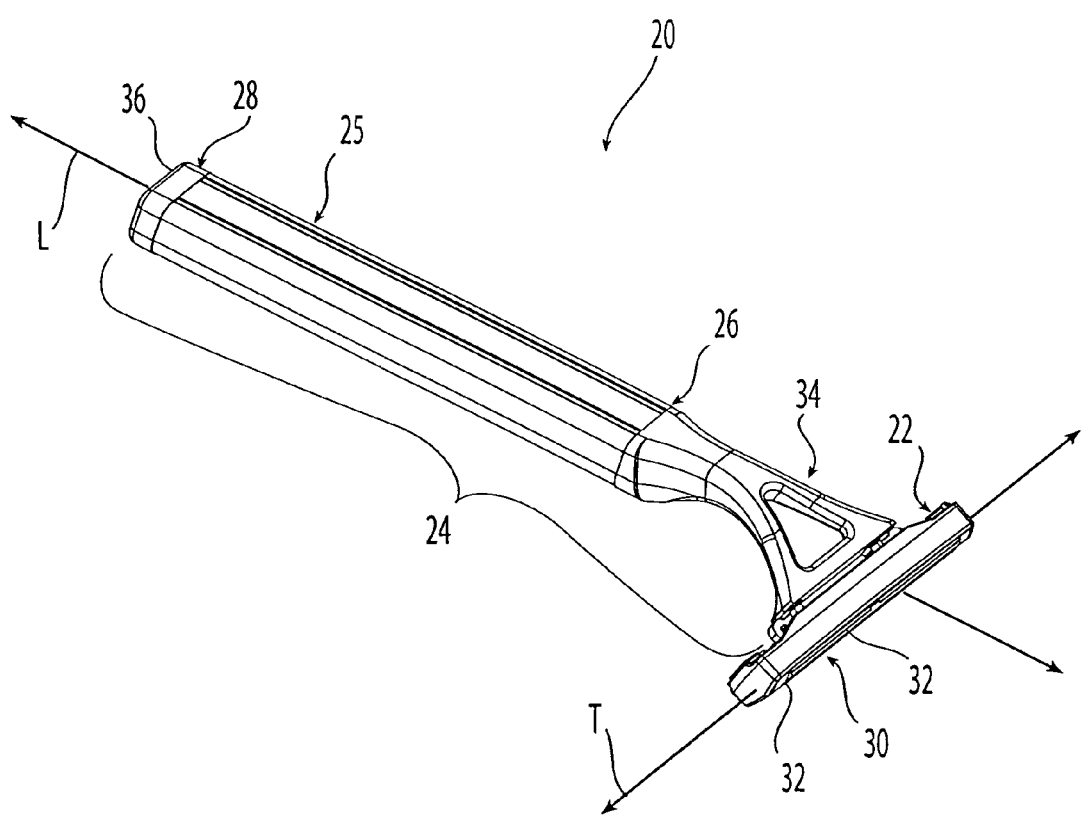
FIG. 1 is a perspective view of an exemplary shaving razor in accordance with the present invention.
Figure 2:
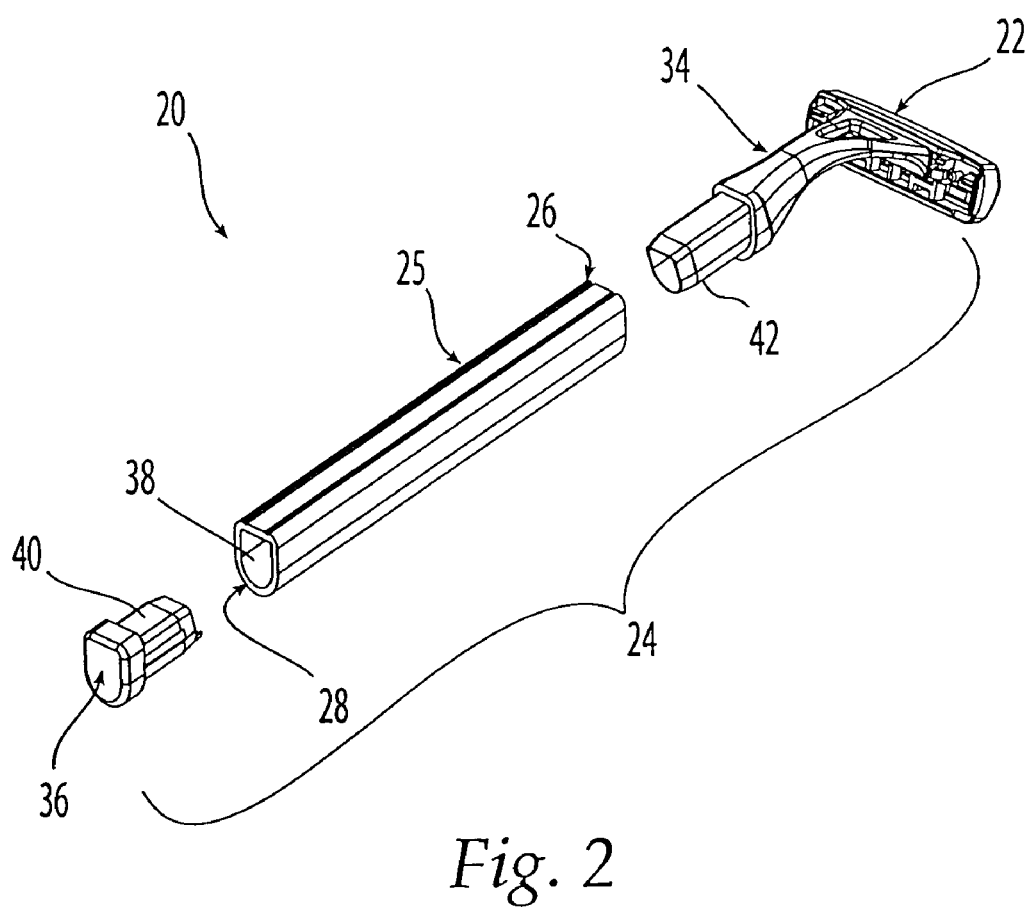
FIG. 2 is a partially exploded, perspective view of the shaving razor of FIG. 1.

Referring to FIGS. 1 and 2, there is shown an exemplary razor 20 formed in accordance with the principles of the present invention. Razor 20 includes a shaving head or razor blade carrier 22 and a razor handle 24. A handle such as disclosed in U.S. Pat. No. 5,727,328, which patent is hereby incorporated by reference, may be used. As shown in FIGS. 1 and 2, handle portion 25 has a top end 26 and a bottom end 28. Razor 20 has a longitudinal axis L along which the largest/longest dimension of handle portion 25 extends. Shaving head 22 carries one or more blades 30 with cutting edges 32 thereof in appropriate positions for effective shaving. Transverse axis T of shaving head 22 is substantially parallel to cutting edges 32. Shaving head 22 may be a disposable cartridge formed for ready detachment from the handle and replacement with a new cartridge. Alternatively, razor 20 may be a disposable razor 20 in which shaving head 22 and handle 24 are disposed of, together, once blades 30 become dull.

Preferably, handle portion 25 is a suitable length and circumference and is otherwise shaped and configured for easy grasp by a user. Those skilled in the art will recognize that suitable length and cross-sectional dimensions of the razor handle portion may vary over a wide range. If handle portion 25 is hollow, then the minimum wall thickness of handle portion 25 must be sufficient to provide handle portion 25 with substantial rigidity and will depend upon the characteristics of the material or materials from which handle portion 25 is formed as well as the cross-sectional shape of handle portion 25. It will be appreciated that the cross-sectional shape of handle portion 25 need not be completely symmetrical, and may be at least partially asymmetrical.

In the embodiment of FIGS. 1 and 2, handle 24 further includes a neck piece 34 extending from top end 26 of handle portion 25. Neck piece 34 may be formed separately from handle portion 25 or handle 24 may be formed as a one piece unit with a handle portion 25 and neck piece 34. The configuration of handle 24 is exemplary, and in another embodiment, handle 24 can be modified as known by those of ordinary skill in the art. Shaving head 22 may thus be coupled to handle 24 via neck piece 34. An end plug, such as a molded plastic end plug 36, is preferably coupled to bottom end 28 of handle portion 25.

Handle portion 25, neck piece 34, and end plug 36 may be coupled together in any desired manner, as will be known to those skilled in the art. For example, handle portion 25, neck piece 34, and end plug 36 may be thermally, kinetically, or ultrasonically welded, press-fitted, friction-fitted, adhered with a bonding agent, or coupled in any other manner which securely couples these elements together. In the embodiment of FIG. 2, handle portion 25 is formed with a substantially hollow interior 38, and neck piece 34 and end plug 36 include respective insert members 40 and 42. Each member 40 and 42 is sized to fit within the hollow ends of handle portion 25 resulting from forming handle portion 25 with hollow interior 38. In this manner, neck piece 34 and end plug 36 may each be attached to handle portion 25 by press fitting the respective insert members 40 and 42 into the ends of handle portion 25. If desired, glue or other adhesive agents may be used to further secure insert members 40 and 42 in respective ends 28 and 26 of hollow handle portion 25. Alternatively, another means of securing at least one of neck piece 34 and end plug 36 to handle portion 25 may be used, such as welding. It is noted that handle portion 25 of razor 20 need not be hollow, and neck piece 34 and end plug 36, if any, may be attached to handle portion 25 by means other than the insert members 40 and 42.

Shaving head 22 and handle 24 are connected in a "floating" manner. As used in this specification and the appended claims, the term "floating" refers to a shaving head that is capable of pivoting about and moving along multiple axes, as discussed in detail below. Accordingly, handle 24 is coupled to shaving head 22 via a connection assembly to permit a floating connection between shaving head 22 and handle 24. For example, the connector assembly may include a head-engaging element and a handle-engaging element configured to be movable with respect to each other to permit a floating engagement therebetween, as will be described in further detail below with reference to the exemplary embodiments of the figures. Before more detailed description of such connection is described, further descriptions of the shaving head 22 and the handle 24 are provided.

Figure 3:
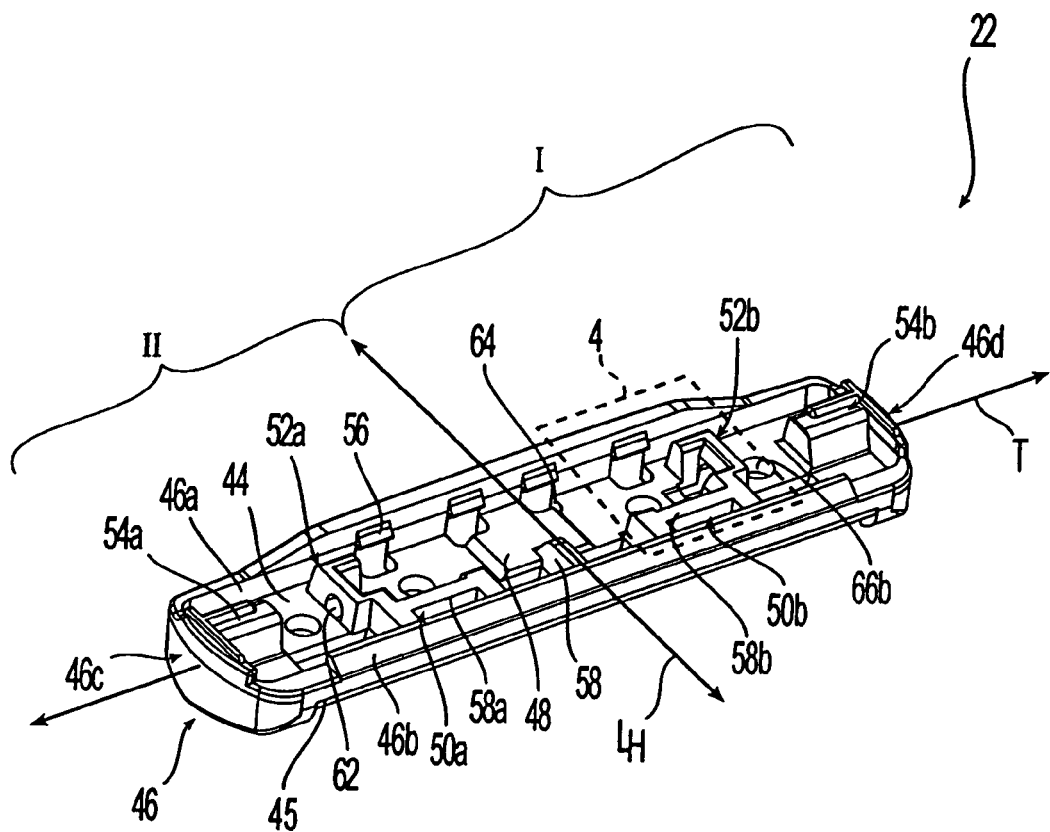
FIG. 3 is a bottom, perspective view of a shaving head according to a preferred embodiment of the present invention for use in the razor of FIG. 1.

In the embodiment of FIGS. 1 and 3, shaving head 22 is constructed as a one-piece, injection-molded component with a generally rectangular structure that is elongated along a transverse axis T parallel to cutting edges 32 of razor blades 30 carried by shaving head 22. Shaving head 22 may include any of the guard, blade seat, and cap features that are well-known in the art. The configuration of head 22 is exemplary, and in another embodiment, head 22 can be modified as known by those of ordinary skill in the art.

Referring to FIG. 3, shaving head 22 includes a central, longitudinal axis $L_H$ about which the head is substantially symmetrical. Axis $L_H$ is also parallel to longitudinal axis L (as shown in FIG. 1) of razor 20 when shaving head 22 is in a rest position. Shaving head 22 defines a first side I and a second side II divided by and preferably symmetrical about axis $L_H$.

Shaving head 22 further includes a base 44 (e.g., the blade seat on which blades 30 are mounted or a component thereof) which may include any desired features. Base 44 is configured for engagement with handle 24 and may include a handle-engaging element to that effect, as discussed in greater detail below. In addition, base 44 preferably includes a guard bar 45 and may include various components that extend downwardly therefrom, such as a peripheral lip 46 including resilient segments 46a–d, a plateau-like projection 48, a pair of lower members 50a and 50b, a pair of medial connection members 52a and 52b, and a pair of projections 54a and 54b. It will be appreciated that additional or different components may be provided on base 44, or the aforementioned components may not be included, without defeating the principles of the present invention.

Figure 4:
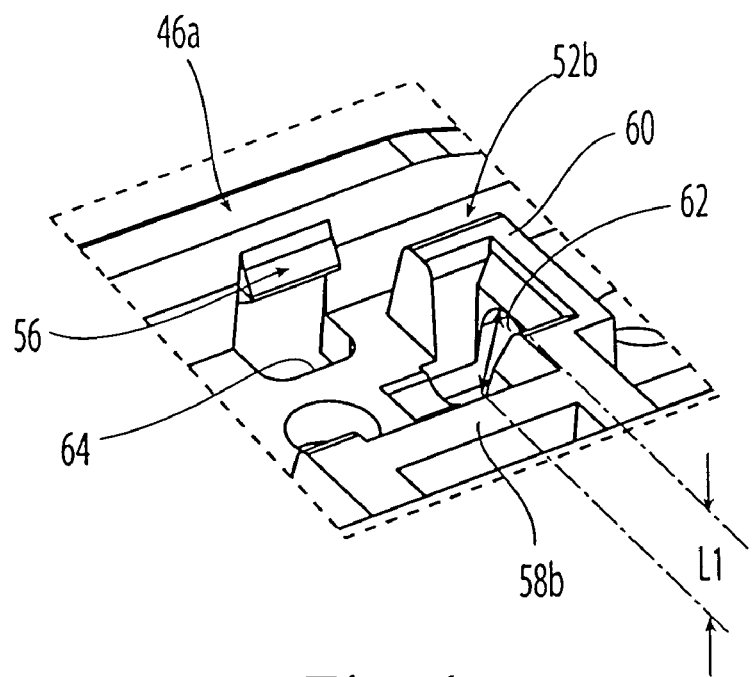
FIG. 4 is an enlarged, bottom, perspective view of a portion of the shaving head within the area designated by arrow 4 of FIG. 3.

Referring to FIGS. 3 and 4, the peripheral lip 46 is formed about the periphery of base 44 and includes back segment 46a, front segment 46b, and side segments 46c and 46d. The inner surface of back segment 46a includes a plurality of inwardly extending claws or projections 56. As best seen in FIG. 4, each of the claws 56 preferably has a triangular cross-sectional shape. Claws 56 may be provided to engage an adapter unit such as disclosed in PCT Application No. PCT/US98/19997, filed Sep. 24, 1998, with the inventor Gratsias named, which PCT application is incorporated herein by reference in its entirety.

A plateau-like projection 48 extends from the center of base 44 aligned with axis $L_H$ and an optional internal wall 58. Projection 48 may serve as a camming surface for a biasing element, as described in greater detail below. It will be appreciated that projection 48 may be configured differently than as shown and need not even project beyond adjacent portions of base 44, particularly if the illustrated configuration is not suitable for the desired function of projection 48.

A pair of lower support structures 50a and 50b and a pair of medial connection members 52a and 52b extend from base 44 on either side of projection 48 with lower support structures 50a and 50b adjacent front segment 46b. Supports 54a and 54b extend from base 44 adjacent to side segments 46c and 46d, respectively.

Referring to FIGS. 3 and 4, supports 50a and 50b extend between base 44 and guard bar 45 (if provided). Supports 50a and 50b support guard bar 45 perpendicularly, during shaving, in order to retain the same distance from blade edges 32 along the entire width of guard bar 45 and blades 30, thereby maintaining a constant skin gap distance. Preferably, supports 50a and 50b include transversely extending members 58a and 58b such as for adding rigidity to base 44 and the overall system as well as for engagement of the adapter mentioned above.

Connection members 52a and 52b may be configured as a handle-engaging element with which handle 24, or a portion thereof, is engaged. Each of connection members 52a and 52b includes a member 60 that defines cutout 62. Cutouts 62 of connection members 52a, 52b together form the handle-engaging element and are configured to permit coupling of shaving head 22 to handle 24, such as via neck piece 34, for a floating connection, as will be described in further detail below. The length dimension L1 of cutouts 62 extends substantially perpendicular to base 44 for reasons as will become apparent.

Figure 5:
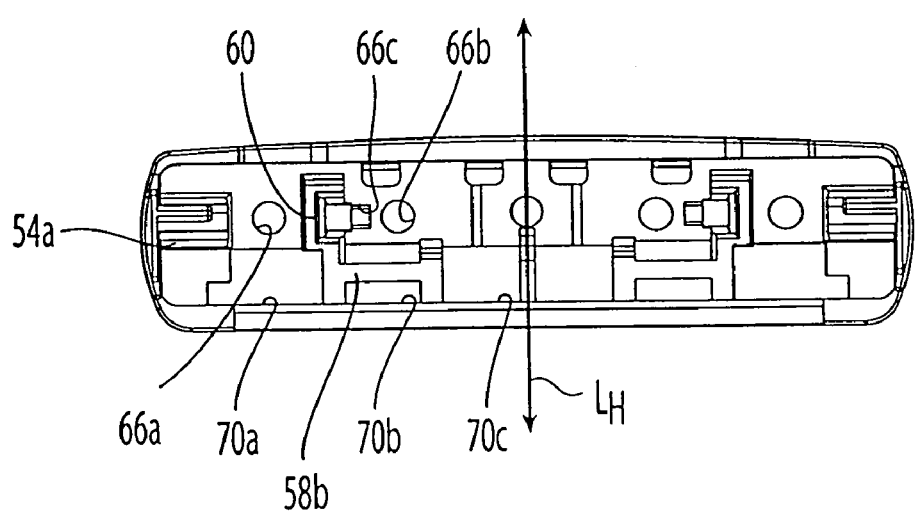
FIG. 5 is a bottom, elevational view of the shaving head of FIG. 3.

Referring to FIGS. 3, 4, and 5, base 44 further defines three sets of slots and/or holes. The sets of slots are best seen in FIG. 5, showing the bottom face of base 44. Although only the slots in the sets on one side of axis $L_H$ will be discussed, such descriptions are applicable to the slots on the opposite side of axis $L_H$. The first set of slots 64 is adjacent back segment 46a. Each slot 64 is transversely spaced from the adjacent slot so that each slot is aligned with one claw 56. Each of the slots 64 on the outer ends of the set can extend partially into back segment 46a to form cutouts (not shown) in back segment 46a.

Figure 8:
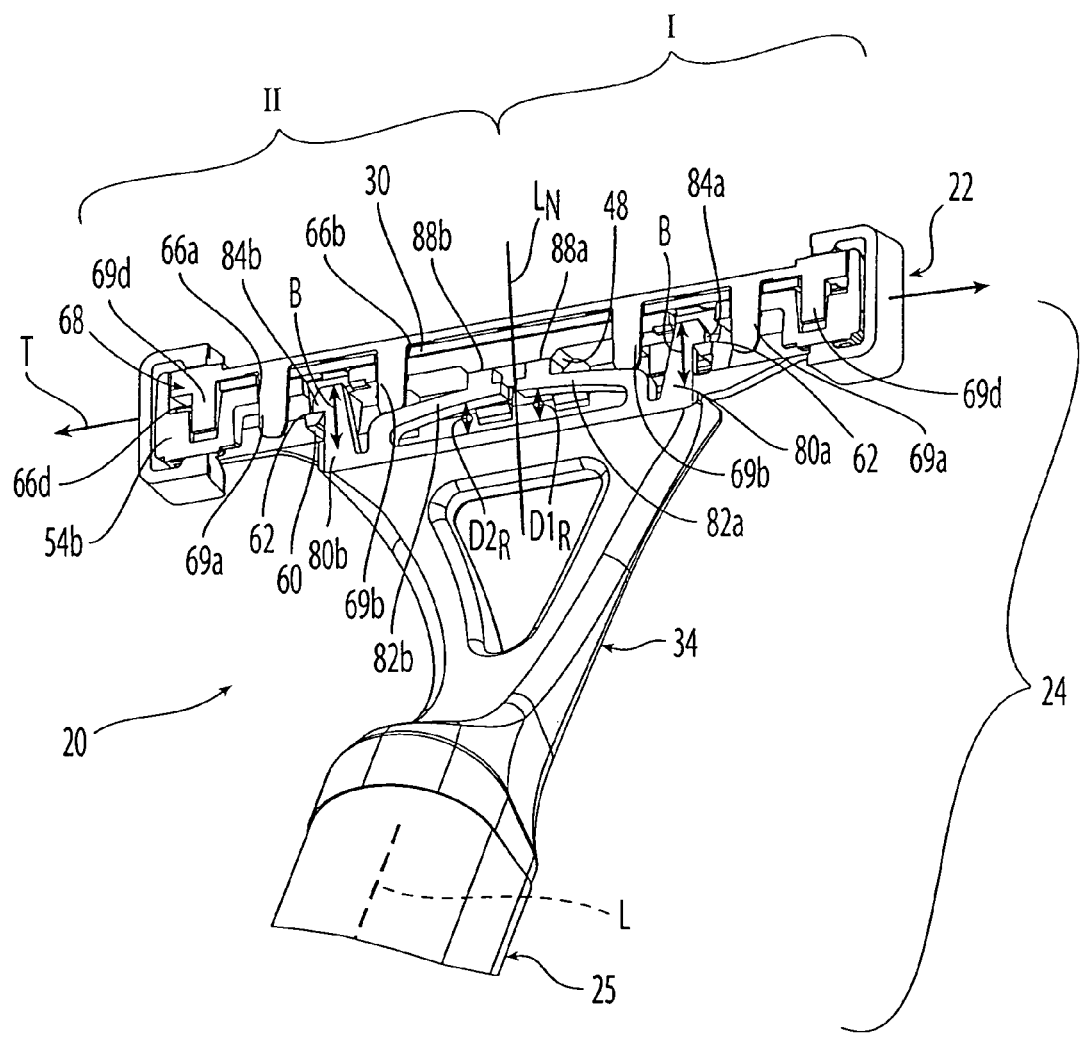
FIG. 8 is an enlarged, partial, perspective view of the razor of FIG. 1 with the shaving head engaged with the neck piece.

The second set of holes 66a–d (as best seen in FIGS. 5 and 8) are spaced between back segment 46a and front segment 46b. The second set includes circular holes 66a and 66b and elongated hole 66c therebetween. Hole 66d in the second set is adjacent hole 66a and aligned with supports 54a and 54b (as seen in FIGS. 3 and 8). If supports 54a and 54b are provided, then square holes 66d are blind holes accessible only at the top face of base 44 and covered by supports 54a and 54b along the bottom face of base 44. Member 60 of connection members 52a and 52b (as seen in FIG. 3) crosses over the elongated hole 66c so that cutout 62 (as seen in FIG. 4) is in communication and aligned with elongated hole 66c. As shown in FIGS. 1 and 8, blade cover 68 is mounted over base 44 (and blades 30) and has projections 69a, 69b, and 69d that are received in holes 66a, 66b, and 66d, respectively, and secured therein (such as by mechanical deformation thereof) to couple blades 30 to head 22.

Referring to FIGS. 3 and 5, the third set of slots 70a–c adjacent front segment 46b. As best seen in FIG. 5, slots 70a and 70c are disposed on either side of central slot 70b. Central slot 70b is aligned with member 58b of lower support member 50b positioned at the bottom face of base 44. Slots 70a–c are provided between base 44 and guard bar 45 and serve as water rinsing/cleaning areas.

Referring to FIGS. 1 and 3, shaving head 22 is coupled to handle 24 by a connector assembly which, in a preferred embodiment, is a head-engaging element on handle 24 coupled to a handle-engaging element on base 44 of shaving head 22. The head-engaging and handle-engaging elements may be formed in any desired shape and/or configuration which enables floating movement of shaving head 22 with respect to handle 24. In the exemplary embodiment of FIGS. 1–6, the head-engaging element includes insertion elements (or pins 84a, 84b) shaped for insertion into cutouts 62 in the handle-engaging element to permit floating support of shaving head 22 on handle 24. Moreover, as may be appreciated with reference to FIG. 8, the head-engaging element and the handle-engaging element of the connector assembly embodiment illustrated therein contact each other and are configured to couple head 22 and handle 24 together as a result of such coupling and contact. Of course, other arrangements of a connector assembly are possible in accordance with the principles of the present invention. For instance, the shaving head may include elements shaped for insertion into cutouts on the handle, instead.

A biasing element is preferably provided to bias the shaving head into a rest position, once forces are removed from the shaving head. In a preferred embodiment, the biasing element is separate and spaced from the connector assembly to permit independent functioning of the connector assembly and the biasing element.

Figure 6:
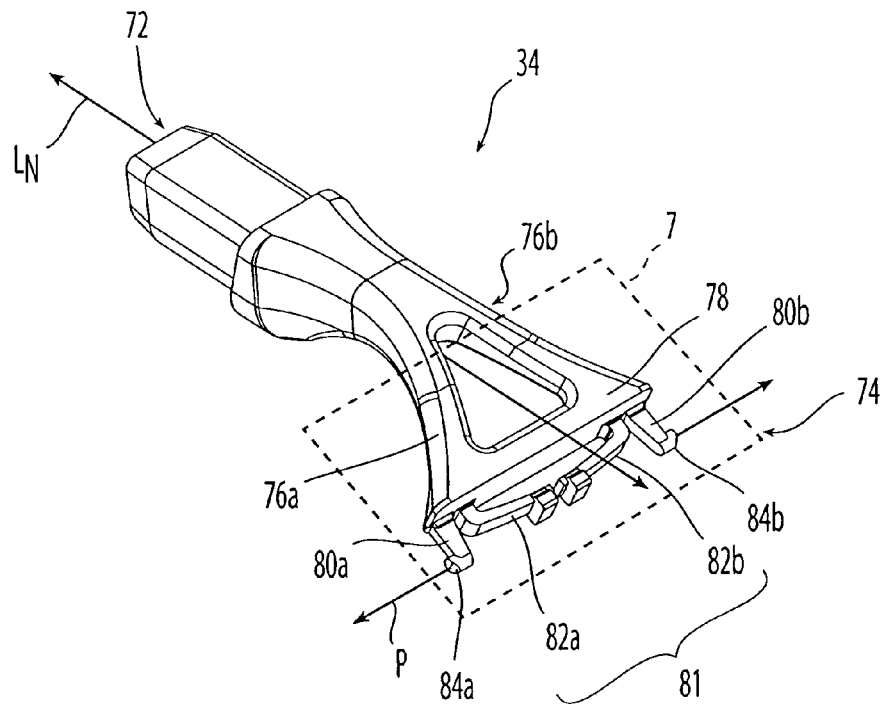
FIG. 6 is a front, perspective view of a neck piece according to a preferred embodiment of the present invention for use with the shaving head of FIG. 3.
Figure 7:
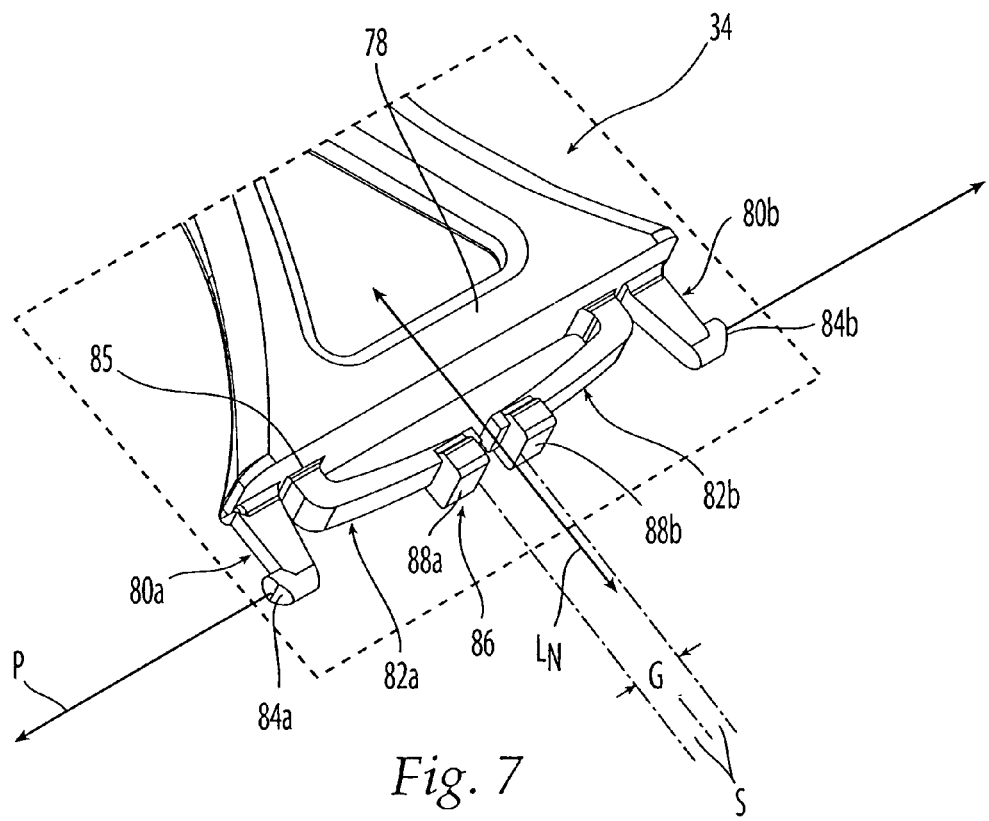
FIG. 7 is an enlarged, front, perspective view of a portion of the neck piece within the area designated by arrows 7 of FIG. 6.

In the exemplary embodiment of FIGS. 6 and 7, the head-engaging element is provided on neck piece 34. However, the head-engaging element may be provided directly on razor handle 24 or handle portion 25 without use of an intermediate neck piece. The configuration of neck piece 34 is exemplary, and in another embodiment can be modified as known by those of ordinary skill in the art. Neck piece 34, according to the exemplary embodiment of FIGS. 6 and 7, is constructed as a one-piece, injection-molded component. Neck piece 34 includes a first or proximate end 72 and a spaced distal end 74. Neck piece 34 extends along neck longitudinal axis $L_N$ extending between ends 72 and 74. Neck longitudinal axis $L_N$ may be coaxial to shaver longitudinal axis L or transverse thereto as shown in FIG. 8. Between ends 72 and 74, neck piece 34 bifurcates into two arms 76a and 76b forming a V-shape. Arms 76a and 76b are joined at their ends by a bridge portion 78.

Still referring to the exemplary neck piece 34 of FIGS. 6 and 7, bridge portion 78 at distal end 74 of neck piece 34 includes a pair of posts 80a and 80b and a biasing element 81 therebetween. In this embodiment, the biasing element is a pair of cantilever, leaf-spring arms 82a and 82b. It will be appreciated that the present invention is not limited to the particular biasing element shown herein. The biasing element can be any component that applies a force on head 22 to move head 22 into a rest or first position. In accordance with one manner of embodying the present invention, the biasing element biases head 22 away from handle 24 and neck piece 34. Leaf-spring arms 82a and 82b are preferably symmetrically arranged about neck longitudinal axis $L_N$ of neck piece 34.

Posts 80a and 80b extend upwardly from bridge portion 78 and have pins 84a and 84b, respectively, which extend transversely from posts 80a and 80b. Most preferably, pins 84a and 84b extend parallel to transverse axis T (as shown in FIG. 1). Although pins 84a and 84b are formed to extend outwardly from posts 80a and 80b, pins 84a and 84b can be formed to extend inwardly from the posts and still provide the benefits of the present invention so long as the shaving head is modified to function therewith. Preferably, posts 80a and 80b are resiliently yieldable and may be biased apart from or towards each other. Posts 80a, 80b and pins 84a, 84b form the head-engaging element and are one manner in which the head-engaging element may be embodied. If desired, a bracketing element (not shown) may be provided to secure the connection between posts 80a, 80b and respective cutouts 62 in shaver head 22, while nonetheless permitting the floating connection of head 22 to handle 24. Such bracketing element, as provided with the embodiment of FIGS. 6 and 7, may be in the form of an additional post spaced laterally outward from posts 80a and 80b to permit members 60 of connection members 52a, 52b to be inserted between the bracketing element and its respective post.

Referring to FIG. 7, leaf-spring arms 82a and 82b are disposed between posts 80a and 80b. It will be appreciated that the configuration of the connector assembly and the biasing element is not critical to achieving a floating connection of the head to the handle. One end 85 of each of the leaf-spring arms 82a and 82b is joined to an exterior surface of handle 24 preferably at bridge portion 78 near the base of posts 80a and 80b, respectively. The other or free end 86 of each of leaf springs 82a and 82b is movable and spaced from handle 24 and bridge portion 78. Thus, leaf springs 82a and 82b are cantilevered members and extend directly from the exterior surface of handle 24. In this embodiment, free ends 86 are offset from fixed ends 85 so that they are not aligned therewith. Each free end 86 is spaced from longitudinal axis $L_N$, as indicated by distance S, and spaced from each other to form a gap G therebetween. Free ends 86 terminate with cam surfaces 88a and 88b for each respective arm 82a and 82b for camming against projection 48 of head 22 (as shown in FIG. 3).

Referring to the exemplary embodiment as shown in FIG. 8, to engage shaving head 22 with neck piece 34 to form razor 20, posts 80a and 80b are flexed inwardly toward each other and pins 84a and 84b are inserted into cutouts 62. Thus, posts 80a, 80b and pins 84a, 84b form a head-engaging element for engaging cutouts 62 of connection members 52a, 52b, which together form a handle-engaging element to connect head 22 movably to handle 24. Once inserted into cutouts 62, pins 84a and 84b are retained therein by respective members 60. Thus, neck piece 34 is directly connected to and in contact with head 22. In addition, cam surfaces 88a and 88b of leaf springs 82a and 82b contact plateau-like projection 48 to bias head 22 into a rest position. It will be appreciated that projection 48 may be flush with base 44, depending on the configuration of the biasing element. Shaving head 22 is thereby movably and releasably coupled to handle 24 via neck piece 34 for movement about or along more than one axis, as discussed in detail below.

Referring to FIGS. 3 and 5, the configuration and dimensions of cutout 62 and slot 66c allow easy insertion and removal of the pins 84a and 84b (as seen in FIG. 6) from head 22. However, slot 66c can be configured and dimensioned so that coupling of pins 84a and 84b of neck piece 34 to head 22 requires less force than separation of neck piece 34 from head 22. Neck piece 34 is snap-fit into head 22 in this embodiment.

In accordance with the principles of the present invention, head 22 and handle 24 are coupled together in a floating manner. One manner of achieving such floating connection is to couple the head-engaging and handle-engaging elements together to permit relative motion therebetween which would permit pivoting (pitching) movement of head 22 about axis T, as well as movement of all or part of head 22 closer to handle 24 (rolling or cushioning movement).

Figure 9:
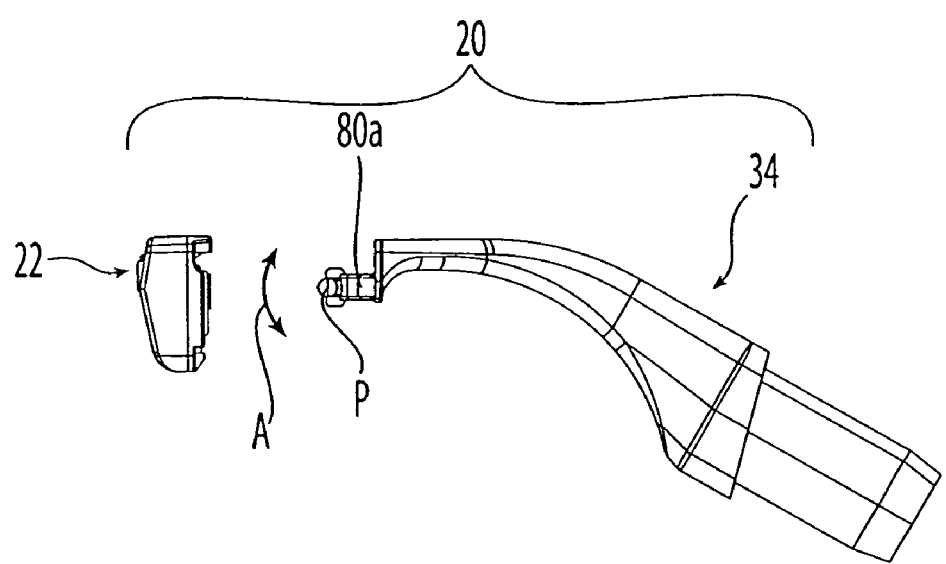
FIG. 9 is an exploded, partial, side perspective view of the razor of FIG. 1 with the shaving head disengaged from the neck piece.
Figure 10:
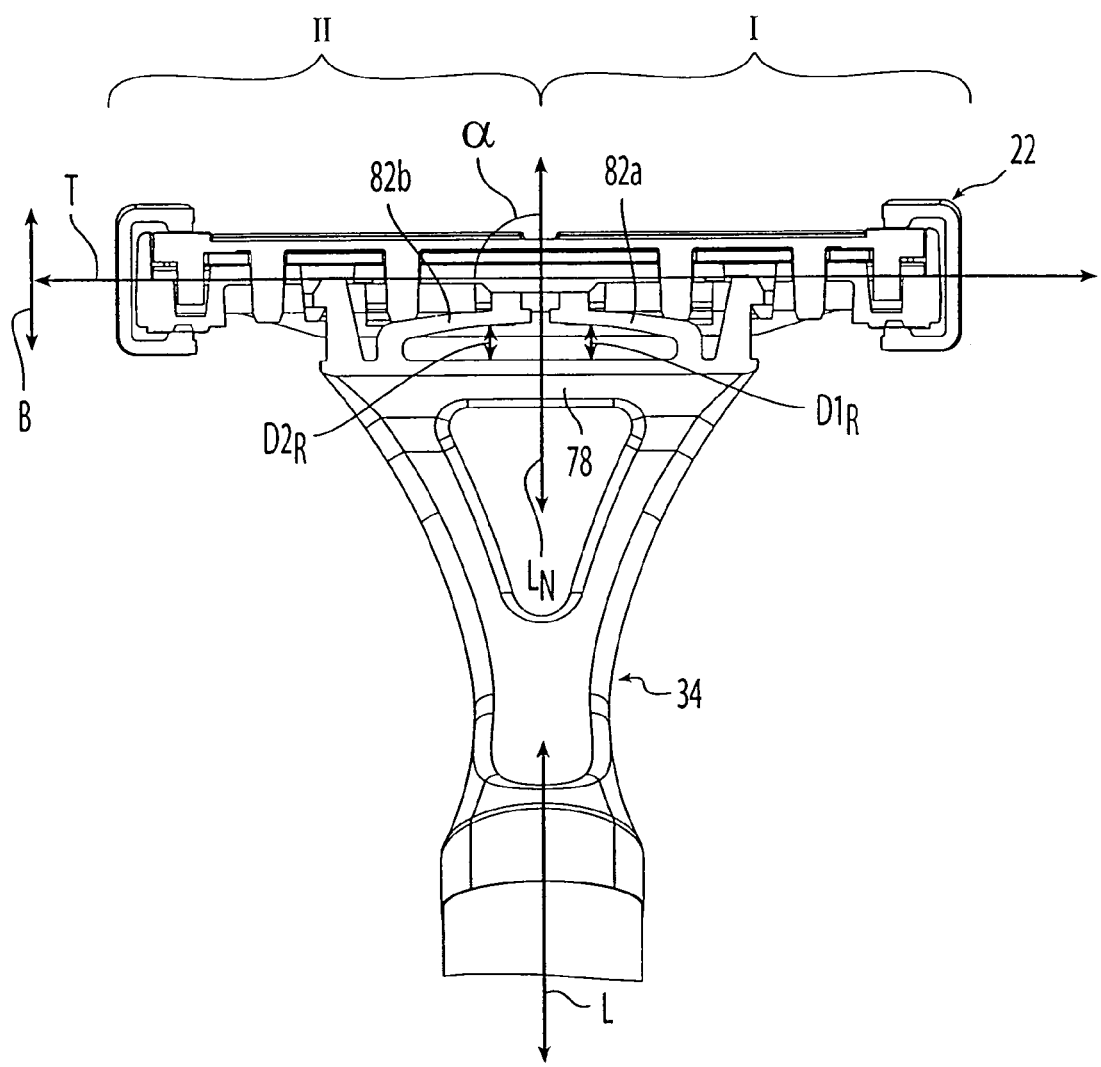
FIG. 10 is a partial, elevational view of the razor of FIG. 1, wherein the shaving head is in a first or rest position.

In the embodiment of FIGS. 8 and 9, connection members 52a and 52b, particularly members 60 and cutouts 62 thereof, and posts 80a and 80b and pins 84a and 84b are configured and dimensioned so that head 22 can move about and along multiple axes. Thus, head 22 is able to pivot forward and backward (a pitching movement) about pins 84a and 84b and about pivot axis P through pins 84a and 84b (parallel to axis T) with respect to razor handle 24, as illustrated by arrow A, as well as in directions toward and away from handle 24 (and thus neck piece 34 or bridge portion 78), as illustrated by arrows B. The movement in the direction of arrows B occurs when forces F are applied to head 22. Specifically, when equal forces are applied to sides I and II of head 22, head 22 is pushed towards handle 24 and leaf-spring arms 82a and 82b both are compressed equally so that transverse axis T of head 22 remains perpendicular to longitudinal axes L and $L_N$ even when out of the rest position, resulting in a cushioning motion. Additionally, sides I and II of head 22 may move along directions B independent of each other to effect a rolling motion of head 22. Thus, the relationship between transverse axis T and longitudinal axis $L_N$ of neck piece 34 changes from perpendicular to oblique in a rolling movement of head 22 about the axis $L_H$. This movement is allowed by the configuration and dimensions of cutouts 62, holes 66c (as shown in FIG. 5), and pins 84a therein. In addition, the provision of a biasing element enhances the cushioning and rolling motions. The biasing element (e.g., leaf springs 82a and 82b of the embodiment of FIG. 8) biases head 22 back into the rest position after any of the above-described movements of the head by biasing head 22 into a rest position with respect to handle 24. However, the configuration and dimensions of projection 48, and arms 82a and 82b, and cutouts 62 permit movement of head 22 towards handle 24 against the biasing element to effect cushioning or rolling motions of head 22.

Thus, as will be appreciated, head 22 and handle 24 are coupled together to permit movement of head 22 with respect to handle 24 about and along more than one axis. In accordance with one aspect of the invention not necessary to achieve other aspects of the present invention, the biasing element may be provided separate and preferably spaced apart from the connector assembly. Such separation of these components permits the biasing element and the connector assembly to function independently. Thus, the function of the biasing element is unaffected by the position or orientation of head 22 with respect to handle 24. This is in stark contrast to the above-described shaving razor shown in the Ullmo patent in which the biasing springs are fixed with respect to the tabs which connect the handle to the head and therefore do not readily bias the head into a rest position if the head is pivoted about the rivet axes and away from the biasing springs.

Illustrative possible motions of head 22 with respect to handle 24 will now be described with reference to the embodiment of FIGS. 6-11. As shown in FIG. 8, head 22 is in the rest position so that an angle α between transverse axis T and neck longitudinal axis $L_N$ is about 90°. In the rest position, a distance between leaf-spring arm 82a and bridge portion 78 is designated $D1_R$, and a distance between leaf-spring arm 82b and the bridge portion 78 is designated $D2_R$, $D1_R$ and $D2_R$ being measured at the same distance from axis $L_N$. In the rest position, distance $D1_R$ and distance $D2_R$ are substantially equal.

Figure 11:
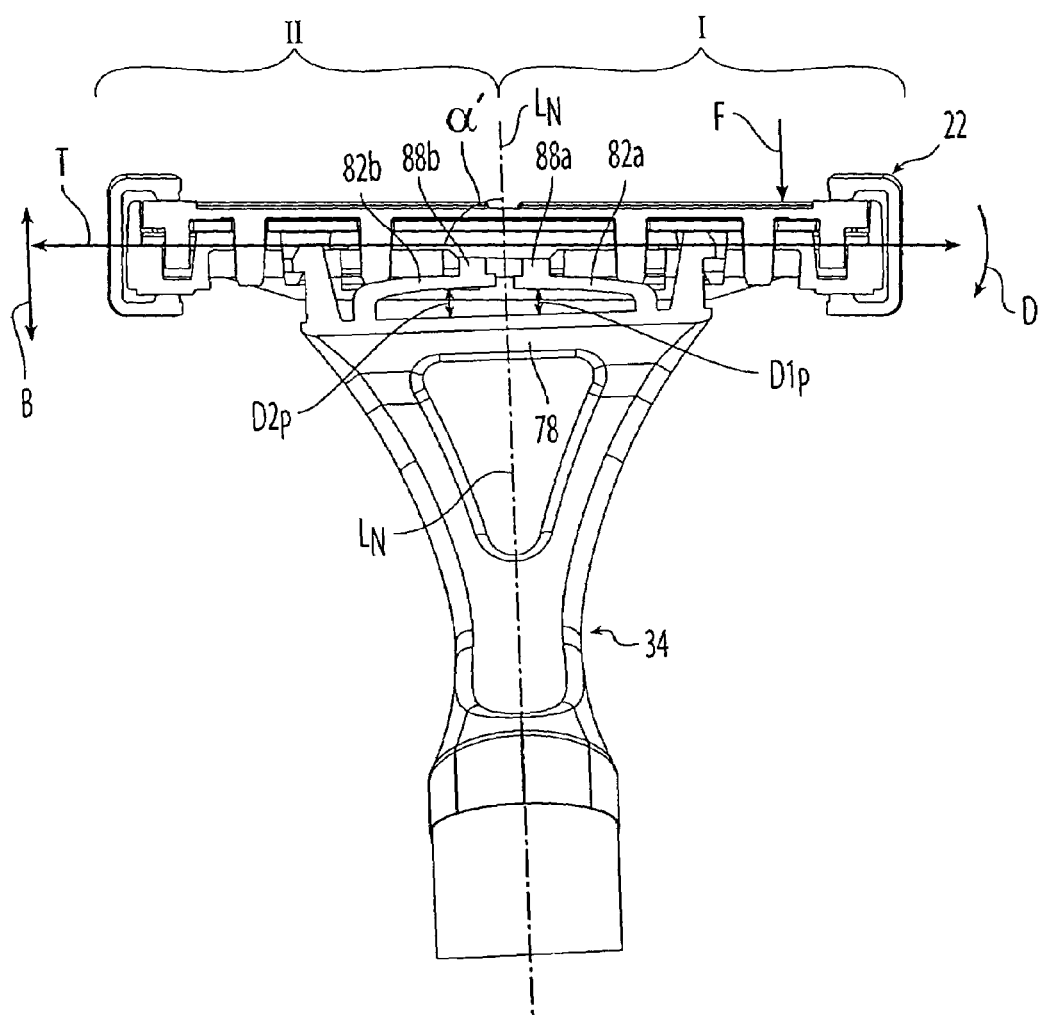
FIG. 11 is a partial, elevational view of the razor of FIG. 10, wherein the shaving head is in a pivoted position.

Referring to FIG. 11, when at least one force F is applied to one side I of head 22, head 22 rolls as labeled D about axis $L_H$ so that the angle α changes from 90° to angle α' that is less than 90°. In the rolled position, transverse axis T is oblique with respect to neck longitudinal axis $L_N$.

Furthermore, plateau-like projection 48 exerts a force on leaf spring arms 82a and 82b by camming engagement with cam surfaces 88a and 88b. In the rolled position of FIG. 11, the distance between leaf-spring arm 82a and bridge portion 78 is designated $D1_P$ and the distance between leaf-spring arm 82b and bridge portion 78 is designated $D2_P$. As shown in FIG. 11, distance $D1_P$ is substantially less than distance $D2_P$. Thus, one leaf spring arm 82a is compressed toward bridge portion 78 and the other leaf spring arm 82b is not compressed. When force F is released, the compressed leaf spring 82a acts in reverse on plateau-like projection 48 to bias head 22 to its original, rest position.

When a force is exerted on side II, springs 82a and 82b react similarly but in an opposite direction and spring arm 82b is compressed more than spring 82a so that head 22 exhibits a rolling movement in the opposite direction. The movable free ends of the leaf-spring arms 82a and 82b bias head 22 to the neutral, rest position when the force is removed, so that the head will return to the rest position. The rolling action shown in FIG. 11 can also occur when unequal forces are applied to sides I and II of head 22.

The upward and downward pivoting or pitching movement A (as shown in FIG. 9), the cushioning movement and effect toward and away from handle 24 in directions B (as shown in FIG. 8), and the rolling side-to-side movement D (as shown in FIG. 11) can occur simultaneously, independent of one another, or in various combinations.

Referring to FIG. 1, because of its multiple degrees of freedom (i.e., its ability to pivot about and along multiple axes) and the cushioning effect, head 22 of shaving razor 20 of the present invention permits the shaving edges of the razor blade or razor blades to conform more accurately to the contours of the skin surface being shaved.

Figure 12:
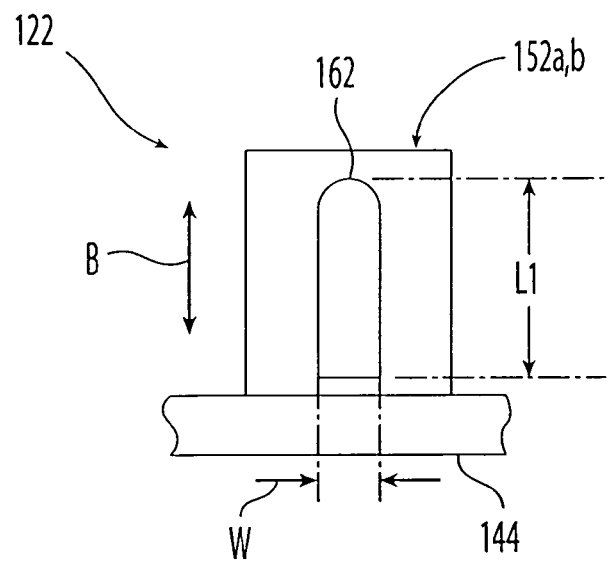
FIG. 12 is a partial, elevational view of a portion of an alternative embodiment of a shaving head of the present invention.

Referring to FIG. 12, an alternate embodiment of a portion of a base 144 of a shaving head 122 is shown. The connection members 152a, 152b of base 144 (corresponding to connection members 52a and 52b of base 44, as shown in FIGS. 3 and 4) include slots 162 instead of cutouts 62 (as shown in FIG. 4). The width, or short dimension, W, of each of slots 162 is slightly larger than the diameter of pins 84a (as shown in FIG. 7) to be inserted therein to couple head 122 and handle 24 together. The length, or long dimension, L1, of each of slots 162 is greater than the cross-sectional diameter of pins 84a and 84b and extends substantially perpendicular to base 144 to permit head 122 to move towards handle 24 when couple thereto. Head 122 of FIG. 12 may be engaged to handle 24 in the same manner as described with respect to head 22 of FIGS. 3-5. Pins 84a and 84b are capable of rotating within slots 162. In addition, the length of each of slots 162 allows head 122 to move in directions B to achieve the cushioning effect. Accordingly, when head 122 is engaged with neck piece 34, head 122 may achieve a similar cushioning effect and pivoting about or along multiple axes as discussed above.

Figure 13:
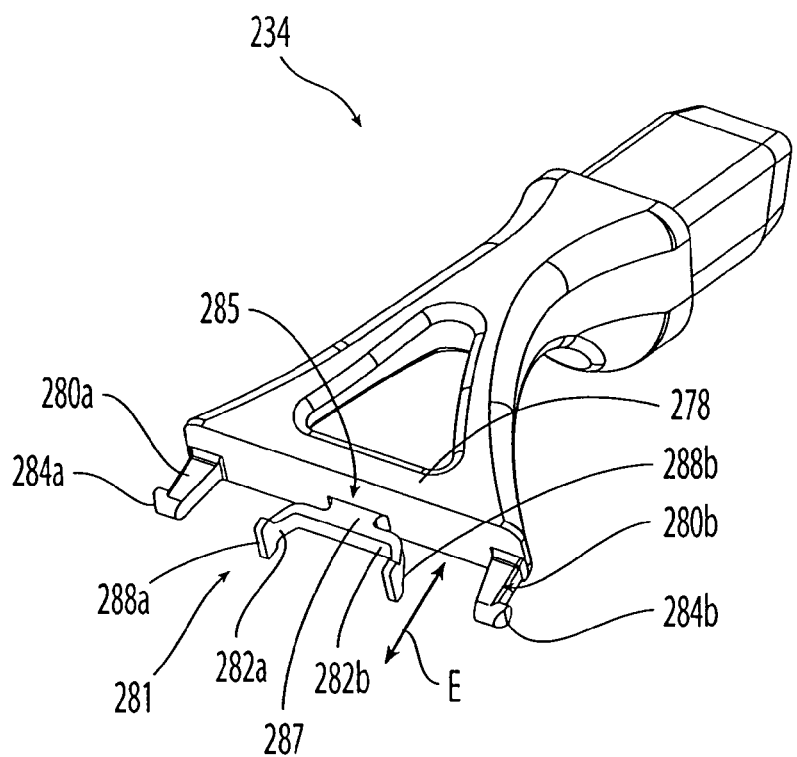
FIG. 13 is a front, perspective view of an alternative embodiment of a neck piece for use with a shaving head similar to the head of FIG. 3.

Referring to FIG. 13, an alternative embodiment of a neck piece 234 is shown. Neck piece 234 is similar to neck piece 34 (as shown in FIGS. 6 and 7) except for the configuration of leaf-spring arms 282a and 282b on bridge portion 278 of neck piece 234. Between posts 280a and 280b, there is disposed a Y-shaped spring member 281. Fixed end 285 of spring member 281 is joined to bridge portion 278 spaced from posts 280a and 280b. Spring member 281, in a direction away moving away from fixed end 285, has a member 287 that bifurcates at the free ends spaced from fixed end 285 into two leaf-spring arms 282a and 282b, which are resiliently yieldable so that they move in the directions indicated by arrow E. The free ends of arms 282a and 282b include cam surfaces 288a and 288b.

Neck piece 234 is engaged with head 22 or 122 of FIG. 3 or 12 by flexing posts 280a and 280b inwardly towards each other and inserting pins 284a, 284b thereon into cutouts 62 or into slots 162, respectively. Arms 282a and 282b of Y-shaped spring member 281 function in the same manner as leaf spring arms 282a and 282b to bias heads 22 or 122 into the rest position and to allow movement of head 22 or 122 about or along multiple axes.

Figure 14:
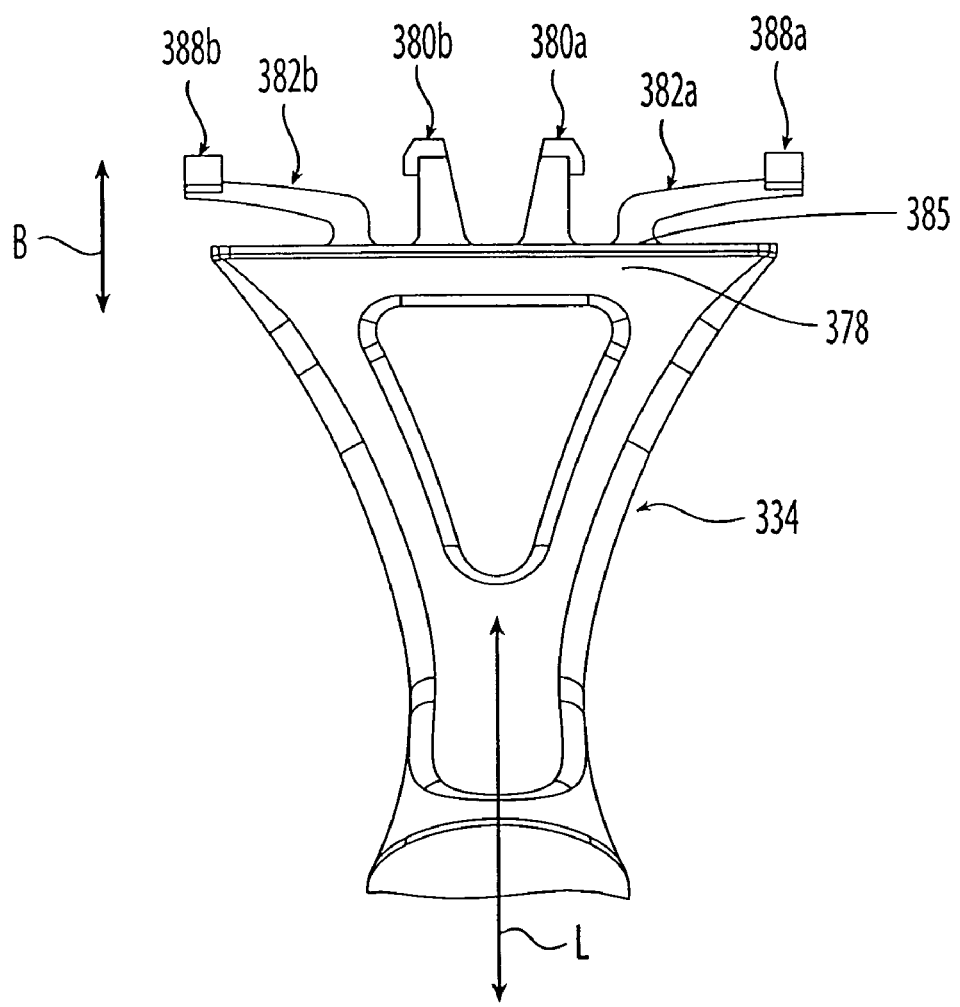
FIG. 14 is a partial, plan view of an alternative embodiment of a neck piece for use with a shaving head similar to the head of FIG. 3.

Referring to FIG. 14, an alternative embodiment of a neck piece 334 is shown. Neck piece 334 is similar to neck piece 34 (as shown in FIG. 6) except for the location and configuration of posts 380a and 380b and leaf-spring arms 382a and 382b. On neck piece 334, posts 380a and 380b extend from the center of bridge portion 378 and arms 382a and 382b are disposed on either side of posts 380a and 380b. Fixed end 385 of each arm 382a and 382b is adjacent a respective post 380a and 380b and the free ends of arms 382a and 382b have cam surfaces 388a and 388b and are free to move in directions indicated by arrow B. Head 22 (as shown in FIG. 3) or head 122 (FIG. 12) must be modified so that the connection members for mating with posts 380a and 380b are in the appropriate position. Neck piece 334 and head 22 or 122 associated therewith function in the same manner as neck piece 34 and head 22 and allow movement of the head about or along multiple axes.

Figure 15:
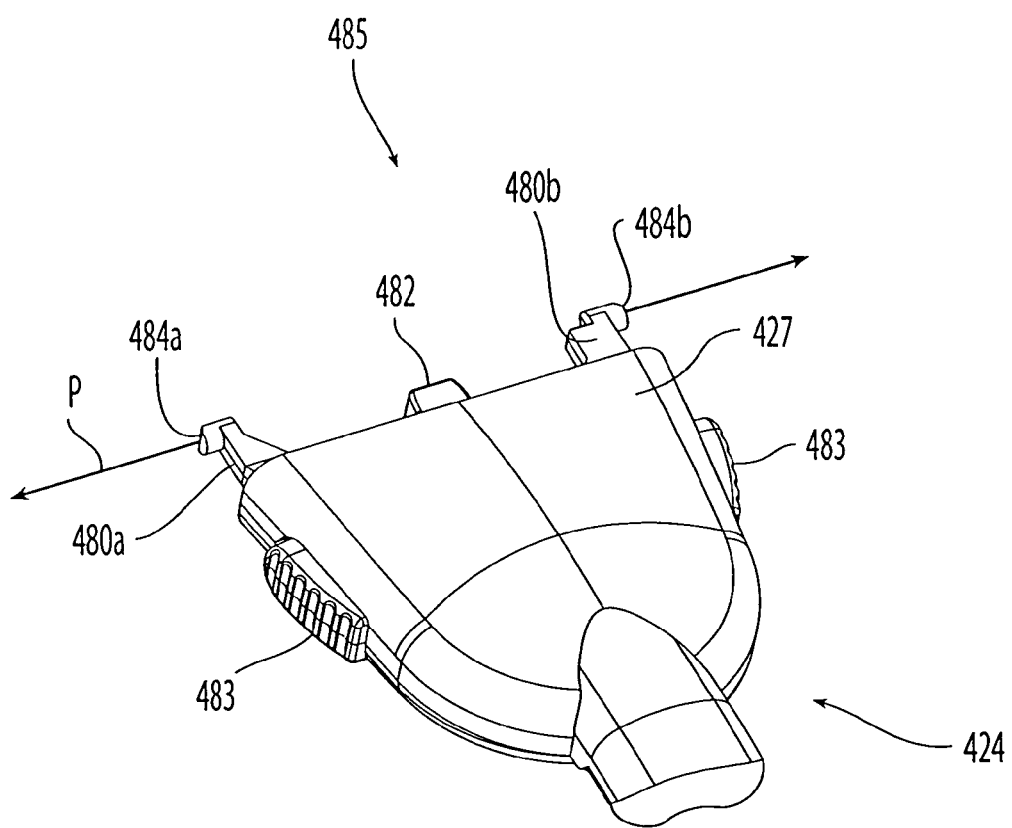
FIG. 15 is a partial, perspective view of an alternative embodiment of a handle for use with a razor according to the present invention.

Referring to FIG. 15, an alternative embodiment of a handle 424 for use with a razor according to the present invention is illustrated. For example, handle 424 can be used with shaving heads 22 and 122 shown in FIGS. 3 and 12. The handle 424 includes a main casing 427 and, extending from one end of the main casing 427, two arm members or posts 480a and 480b, and a central, spring-loaded tongue 482 that acts as the biasing element. Extending from the sides of main casing 427 are two buttons 483 which are operatively coupled to posts 480a and 480b, in any manner known by one of ordinary skill in the art, so that buttons 483 are able to move posts 480a and 480b with respect to each other. Posts 480a and 480b are normally maintained at a predetermined distance from each other determined by main casing 427 as well as the configuration of the shaving head to be coupled thereto.

Posts 480a and 480b include outwardly extending pins 484a and 484b, respectively, which define a pivot axis P about which a shaving head 22 or 122 may be pivotably coupled for a forward and backward pitching movement. The dimensions of pins 484a and 484b are such that they fit into cutouts 62 and 162, as shown in FIGS. 3 and 12, respectively, enabling heads 22 and 122 to move toward and away from handle 424 for either rolling or cushioning movement independently or together with pivoting about axis P.

Although two buttons 483 are shown in the embodiment, of FIG. 15, the present invention is not limited to this number of buttons 483. For example, a single button can be used to move elements for connecting the handle to either a neck piece or directly to the shaving head.

As will be appreciated, the principles of the present invention are readily applied to a razor cartridge system in which the shaving head is a razor cartridge disposable separate from the handle, such as a system in which the handle of FIG. 15 may be used. Thus, the connector assembly of a razor cartridge system, such as with a handle as illustrated FIG. 15, is configured for ready coupling and decoupling of a razor cartridge to the handle. For instance, a cartridge-engaging element on the handle and a handle-engaging element on the cartridge may by configured to engage each other for removably coupling the cartridge and handle without the provision of an additional coupling element (such as a rivet, as in the above-discussed Ullmo patent). The principles of the present invention, thus may be applied to any of the known razor cartridge systems to achieve a floating connection of a disposable razor cartridge to a handle. As will further be appreciated, in order to achieve a floating connection of a shaving head and handle in accordance with the principles of the present invention, the connector assembly may be configured to permit ready coupling and decoupling of the razor cartridge and handle while also permitting a floating connection therebetween. Such coupling may be achieved upon engagement of the head-engaging element with the handle-engaging element without the need for a separate coupling element whether or not the shaving head is a disposable cartridge intended to be separated from the handle for replacement with another cartridge. Such aspect of the invention is independent from the floating connection itself which is achieved by permitting the desired degree of freedom between the head and handle.

One advantageous application of the principles of the present invention is to modify pre-existing razors to permit added mobility to the head, thereby resulting in an added degree of freedom of the head with respect to the handle. For instance, in razors utilizing a connection such as the insertion of pins on a handle into openings in a shaver head (similar to pins 84a and 84b and cutouts 62, as shown in FIG. 8), the size and/or shape of the openings in the shaver head may be readily modified to add mobility to the shaver head with respect to the handle. This modification can be achieved by conventional processes such as drilling and the like. Alternatively, the mold may be changed to form the shaver head with larger openings into which the pins on the handle are inserted. Thus, in accordance with one aspect of the invention, a pre-existing razor having a head movably coupled to a handle via the connector assembly is modified to permit additional directions of movement between the head and handle as a result of modifying the connector assembly. Such modification may be appreciated with reference to above-described FIGS. 3–5, in which shaving head 22 resembles a pre-existing shaving head except for cutouts 62. In a pre-existing shaving head, pins 84a and 84b would be inserted into holes, which substantially conform to the exterior shape of pins 84a and 84b, so that the head pivots about a pivot axis extending through pins 84a and 84b. However, in accordance with the present invention, such holes are enlarged (such as by being configured as elongated cutouts or slots) so that pins 84a and 84b may move in a direction transverse to the pivot axis. More generically, the principles of the present invention may be applied to any connector assembly permitting limited movement between a shaver head and handle to remove restrictions to such movement and thereby impart increased mobility to the head. Thus, any constraints to relative movement between the head and handle are removed while still maintaining a connection between the head and handle.

While it is apparent that the invention herein disclosed is well calculated to fulfill the objects above stated, it will be appreciated that modifications and embodiments may be devised by those skilled in the art. In another embodiment, the leaf-spring arms can be formed by metal leaf springs bent to provide the same functions and connected to the bridge portion of the neck piece. The cam surfaces on the metal spring arms can be provided by a bend in the metal or a plastic cam surface can be attached thereto. Alternatively, the biasing element can be a coil spring or the like. In an additional alternative embodiment, the leaf-spring arms can be disposed on the shaving head or one arm on the head and the other on the neck piece. Furthermore, the posts and pins can be provided on the head and the cutouts defined on the neck piece. Another possible modification is that the head and neck piece can be used with an adapter unit as disclosed in above-incorporated PCT Application No. PCT/US98/19997. The pins can also be formed separate from the neck piece and disposed through the posts and head to allow the movements as discussed above. Moreover, the pins may be configured in any desired manner capable of permitting the desired pivotable connection with the shaving head. For example, although the pins described herein extend laterally outward, the pins may instead extend inwardly towards each other, necessitating movement away from each other to permit engagement with a shaving head. The razor blade shaving heads and neck pieces above may be made with any of the materials and processes that are well-known in the art for making such components, and preferably, for ease of manufacturing and assembly. The embodiments above can be modified so that some features of one embodiment are used with the features of another embodiment. It is intended that the appended claims cover all such modifications and embodiments as fall within the true spirit and scope of the present invention.

What is claimed is:

1. A razor, comprising:
   a handle having a longitudinal axis;
   a shaving head carrying at least one blade with at least one cutting edge and defining a transverse axis parallel to said at least one cutting edge;
   a connector assembly movably coupling said handle to said shaving head; and
   a biasing element spaced apart and separate from said connector assembly and disposed between said shaving head and said handle;
   wherein:
   said connector assembly permits said shaving head to exhibit a first movement toward and away from said handle into and out of a rest position with said shaving head transverse axis maintaining a constant orientation with respect to said handle longitudinal axis;
   at least a portion of said connector assembly is resiliently yieldable to permit coupling of said shaving head to said handle; and
   said biasing element biases said shaving head into said rest position against said first movement.

2. A razor as in claim 1, wherein said connector assembly further permits a pivoting second movement forward and backward about a pivot axis parallel to said transverse axis into and out of said rest position.

3. A razor as in claim 2, wherein said biasing element biases said head into said rest position against said first movement and said second movement.

4. A razor as in claim 2, wherein said connector assembly includes at least one insertion element and at least one cutout shaped to receive said at least one insertion element, wherein said cutout has dimensions greater than the dimensions of said at least one insertion element to allow said first movement and said second movement.

5. A razor as in claim 4, wherein said at least one insertion element is a pin.

6. A razor as in claim 4, wherein said handle, said insertion element, and said biasing element are a single piece.

7. A razor as in claim 4, further including a neck piece coupled to said handle, wherein said neck piece includes said at least one insertion element.

8. A razor as in claim 7, wherein said neck piece includes said biasing element.

9. A razor as in claim 1, wherein said biasing element is at least one leaf spring.

10. A razor as in claim 1, wherein said biasing element is a spring loaded tongue.

11. A razor as in claim 1, wherein during the first movement, when said shaving head is moved out of said rest position, said transverse axis is oblique to said longitudinal axis.

12. A razor as in claim 1, wherein during the first movement, when said shaving head is out of said rest position, said transverse axis is perpendicular to said longitudinal axis.

13. A razor as in claim 1, wherein when said shaving head is out of said rest position, said transverse axis is perpendicular or oblique to said longitudinal axis depending on the degree and location of at least one force applied to said shaving head.

14. A razor, comprising:
   a handle having a first end, a spaced second end, and a longitudinal axis extending between said first and second ends;
   a shaving head carrying at least one blade with at least one cutting edge and defining a transverse axis parallel to said at least one cutting edge;
   a connector assembly comprising a head-engaging element on said handle and a handle-engaging element on said shaving head movably coupling said handle to said shaving head; and
   a biasing element biasing said shaving head into a rest position;
   wherein:
   said head-engaging element and said handle-engaging element move with respect to each other to permit said shaving head to exhibit a first movement toward and away from said handle;
   said head-engaging element and said handle-engaging element are shaped and configured to engage with each other to result in coupling without the need for a separate coupling element.

15. A razor as in claim 14, wherein:
   one of said head-engaging element and said handle-engaging element comprises at least one post with a pin extending therefrom and the other comprises a cutout for receiving said at least one pin; and
   said cutout has dimensions greater than the dimensions of said pin received therein to allow movement of said shaving head toward and away from said handle and pivoting of said shaving head upward and downward about a pivot axis parallel to said transverse axis.

16. A razor as in claim 15, wherein said biasing element is at least one leaf spring disposed between said posts such that at least one free end of said at least one leaf spring is adjacent said longitudinal axis and at least one fixed end of said leaf spring is adjacent said posts.

17. A razor as in claim 15, wherein said biasing element is at least two leaf springs and said at least one post is disposed between said leaf springs such that said fixed ends of said leaf springs are adjacent said at least one post and said free ends of said leaf springs are spaced outwardly therefrom.

18. A razor as in claim 15, wherein said at least one post and pin are formed on said handle and said at least one cutout is formed in said shaving head.

19. A razor as in claim 14, wherein said biasing element is at least one leaf spring disposed between said handle and said shaving head and having a free end.

20. A razor as in claim 19, wherein said free end of said at least one leaf spring has a cam surface formed thereon.

21. A razor as in claim 20, wherein said shaving head further includes a projection extending therefrom, and said cam surface contacts said projection to bias said shaving head into said rest position.

22. A razor as in claim 19, wherein said at least one leaf spring includes two leaf springs each having a free end, said free ends of said leaf springs being spaced apart to form a gap therebetween.

23. A razor as in claim 19, wherein said at least one leaf spring includes two leaf springs each having a fixed end and a free end, said fixed ends of said leaf springs extending from a member that is connected to said handle such that said leaf springs and said member form a Y shape.

24. A razor as in claim 14, wherein said shaving head is releasably coupled to said handle.

25. A razor comprising:
a handle defining a longitudinal axis;
a razor cartridge carrying at least one blade with at least one cutting edge and defining a transverse axis parallel to said at least one cutting edge, said razor cartridge having a longitudinal axis perpendicular to said transverse axis; and
a connector assembly provided between said handle and said razor cartridge to removably couple said razor cartridge to said handle;
wherein:
said connector assembly includes a cartridge-engaging element on said handle and a handle-engaging element on said razor cartridge, with one of said cartridge-engaging element and said handle-engaging element being insertable into the other to result in coupling of said cartridge-engaging element and said handle-engaging element upon insertion; and
said cartridge-engaging element and said handle-engaging element are configured to permit said razor cartridge simultaneously and independently to pivot about said transverse axis in a pitching movement, to move toward and away from said handle with said transverse axis remaining perpendicular to said longitudinal axis of said handle in a cushioning movement, and to pivot about said razor cartridge longitudinal axis in a rolling movement.

26. A razor as in claim 25, wherein said razor cartridge further comprises a bottom surface with a camming surface and wherein said razor further comprises a biasing element contacting said camming surface biasing said razor cartridge into a rest position once a force causing any one of said pitching, cushioning, and rolling movements is removed.

27. A razor as in claim 26, wherein said biasing element is spaced from said connector assembly.

28. A razor as in claim 26, wherein said biasing element is a spring loaded tongue.

29. A razor as in claim 26, wherein one of said cartridge-engaging element and said handle-engaging element is an insertion element and the other of said cartridge-engaging element and said handle-engaging element is at least one cutout shaped to receive said insertion element.

30. A razor as in claim 29, wherein said insertion element includes a post and pin extending transversely therefrom shaped for insertion into said cutout.

31. A razor as in claim 30, wherein:
said post and pin include a first post having a first pin and a second post having a second pin;
said at least one cutout includes a first cutout for receiving said first pin and a second cutout for receiving said second pin; and
said first and second posts are resiliently movable with respect to each other to facilitate insertion into and removal of said first and second pins from said first and second cutouts, respectively.

32. A razor as in claim 31, further including at least one button coupled to at least one of said first and second posts to move said at least one of said first and second posts upon movement of said button.

33. A razor comprising:
a handle defining a longitudinal axis;
a shaving head carrying at least one blade with at least one cutting edge and defining a transverse axis parallel to said at least one cutting edge and a longitudinal axis perpendicular to said transverse axis; and
a connector assembly comprising a head-engaging element formed on said handle and a handle-engaging element formed on said shaving head and movably coupling said shaving handle to said head upon coupling said head-engaging element and said handle-engaging element together;
wherein said head-engaging element and said handle-engaging element are:
configured for insertion of one into the other to result directly in coupling of said shaving head to said handle; and
movable with respect to each other when coupled together to permit said shaving head simultaneously and independently to pivot about said transverse axis in a pitching movement, to move toward and away from said handle with said transverse axis remaining perpendicular to said longitudinal axis of said handle in a cushioning movement, and to pivot about said shaving head longitudinal axis in a rolling movement.

34. A razor as in claim 33, wherein said shaving head further comprises a bottom surface with a camming surface and wherein said razor further comprises a biasing element contacting said camming surface biasing said shaving head into a rest position once a force causing any one of said pitching, cushioning, and rolling movements is removed.

35. A razor as in claim 34, wherein said biasing element is spaced from said head engaging element and said handle engaging element.

36. A razor as in claim 35, wherein one of said head-engaging element and said handle-engaging element is a post with a pin extending therefrom and the other of said head-engaging element and said handle-engaging element is a cutout having dimensions larger than the dimensions of said pin to allow said pitching, cushioning, and rolling movements.

37. A razor, comprising:
a handle having a longitudinal axis;
a shaving head carrying at least one blade with at least one cutting edge and defining a transverse axis parallel to said at least one cutting edge;
a connector assembly movably coupling said handle to said shaving head; and
a biasing element spaced from said connector assembly and disposed between said shaving head and said handle, said biasing element biasing said shaving head into a rest position;
wherein:
said connector assembly permits said shaving head to exhibit a first movement toward and away from said handle into and out of said rest position and a second movement forward and backward about a pivot axis parallel to said transverse axis into and out of said rest position;
said connector assembly includes at least one insertion element formed on one of said shaving head and said handle, and at least one cutout shaped to receive said at least one insertion element;
said cutout has dimensions greater than the dimensions of said at least one insertion element to allow said first movement and said second movement; and
said insertion element is shaped to be retained in said cutout without the provision of an additional coupling element.

* * * * *